(12) United States Patent
Paulraj et al.

(10) Patent No.: US 12,468,811 B2
(45) Date of Patent: Nov. 11, 2025

(54) SYSTEMS AND METHODS FOR UPDATES DURING FIRMWARE AUTHENTICATION

(71) Applicant: Dell Products, L.P., Round Rock, TX (US)

(72) Inventors: Deepaganesh Paulraj, Bangalore (IN); Rama Rao Bisa, Bangalore (IN); Kala Sampathkumar, Bangalore (IN); Mini Thottunkal Thankappan, Bangalore (IN); Hiren Kishorbhai Pitroda, Rajkot (IN)

(73) Assignee: Dell Products, L.P., Round Rock, TX (US)

( * ) Notice: Subject to any disclaimer, the term of this patent is extended or adjusted under 35 U.S.C. 154(b) by 197 days.

(21) Appl. No.: 17/934,228

(22) Filed: Sep. 22, 2022

(65) Prior Publication Data

US 2024/0104214 A1 Mar. 28, 2024

(51) Int. Cl.
*G06F 21/57* (2013.01)
*G06F 8/65* (2018.01)

(52) U.S. Cl.
CPC .............. *G06F 21/572* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 2004/0243994 | A1* | 12/2004 | Nasu | G06F 8/65 717/171 |
| 2006/0200658 | A1* | 9/2006 | Penkethman | H04M 1/72406 713/2 |
| 2019/0042725 | A1* | 2/2019 | Ruan | H04L 9/3265 |
| 2020/0344265 | A1* | 10/2020 | Kelly | H04L 63/0823 |
| 2021/0200529 | A1* | 7/2021 | Yeh | G06F 8/65 |
| 2022/0003817 | A1* | 1/2022 | Khatri | G06F 8/65 |
| 2022/0100687 | A1* | 3/2022 | Sahin | G06F 3/067 |
| 2022/0121749 | A1* | 4/2022 | Liu | H04L 9/3239 |
| 2022/0188419 | A1* | 6/2022 | Stremlau | G06F 8/65 |
| 2023/0077706 | A1* | 3/2023 | Tsang | H04L 9/3236 710/303 |

OTHER PUBLICATIONS

Google Search for "Define Information Handling System," performed on Apr. 25, 2025 (Year: 2025).*

* cited by examiner

*Primary Examiner* — Scott B Christensen
(74) *Attorney, Agent, or Firm* — Fogarty LLP

(57) ABSTRACT

Systems and methods update firmware during authentication of a hardware component of an IHS (Information Handling System), where firmware updates are managed by a remote access controller that provides remote management of the IHS. The remote access controller calculates a measurement based on firmware loaded for use by a hardware component of the IHS. Based on the measurement, an integrity of the firmware loaded for use by the hardware component is validated against a reference signature. When the integrity of the firmware is not validated, the hardware component is quarantined. When the integrity of the firmware is successfully validated, the remote access controller determines whether a firmware update is required for the firmware loaded by the hardware component. When a firmware update is required, an integrity of the updated firmware is validated, the updated firmware is loaded by the hardware component and further initialization of the hardware component is allowed.

20 Claims, 4 Drawing Sheets

SYSTEMS AND METHODS FOR UPDATES DURING FIRMWARE AUTHENTICATION

FIELD

The present disclosure relates generally to Information Handling Systems (IHSs), and relates more particularly to managing firmware used by IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS.

SUMMARY

In various embodiments, IHSs may include: one or more CPUs utilizing one or more buses that connect to a plurality of hardware components of the IHS; and a remote access controller supporting remote management of the Information Handling System (IHS), the remote access controller comprising a logic unit and a memory device having instructions stored thereon that, upon execution by the logic unit, cause the remote access controller to: calculate a measurement based on firmware loaded for use by a first of the hardware components of the IHS; based on the measurement, validate an integrity of the firmware loaded for use by the first hardware component against a reference signature; when the integrity of the firmware is not validated, quarantine the first hardware component; when the integrity of the firmware is successfully validated, determine whether a firmware update is required for the firmware loaded for use by the first hardware component; and when a firmware update is required: validate an integrity of updated firmware for the first hardware component, initiate loading of the updated firmware by the first hardware component and allow further initialization of the first hardware component.

In some IHS embodiments, the initiated loading of the updated firmware by the first hardware component comprises the remote access controller retrieving a firmware image that includes the updated firmware and transmitting the updated firmware to the first hardware component according to a rebootless update protocol. In some IHS embodiments, the reference signature for the firmware loaded by the first hardware component is specified in a factory-provisioned device certificate that authenticates the first hardware component. In some IHS embodiments, the factory-provisioned device certificate comprises a digital identity certificate that is cryptographically bound to the IHS. In some IHS embodiments, the factory-provisioned device certificate is stored to a local storage of the first hardware component during factory-provisioning of the IHS. In some IHS embodiments, the factory-provisioned device certificate is stored at a location specified in a link stored to a local storage of the first hardware component during factory-provisioning of the IHS. In some IHS embodiments, the factory-provisioned device certificate specifies a plurality of digital signatures, each corresponding to a version of firmware approved for operation by the first hardware component. In some IHS embodiments, execution of the instructions further causes the remote access controller to: when a firmware update is required, select an available firmware version for use as the updated firmware for the first hardware component from the firmware versions specified in the device certificate of the first hardware component. In some IHS embodiments, each of the firmware versions specified in the device certificate of the first hardware component comprise firmware for operation of the first hardware component in a different mode. In some IHS embodiments, the quarantine of the first hardware component comprises exclusion of the first hardware component from a root of trusted hardware of the IHS. In some IHS embodiments, the quarantine of the first hardware component comprises restricting certain bus communications by the first hardware component. In some IHS embodiments, the quarantine of the first hardware component comprises disabling the first hardware component. In some IHS embodiments, an operating system of the IHS is not initialized until the integrity of the firmware loaded for use by the first hardware component has been authenticated and no firmware update is required.

In various additional embodiments, methods are provided for updating firmware during authentication of a hardware component of an IHS, wherein the firmware updates are managed by a remote access controller of the IHS that provides remote management of the hardware component. The methods may include: calculating a measurement based on firmware loaded for use by the hardware component; based on the measurement, validating an integrity of the firmware loaded for use by the hardware component against a reference signature; when the integrity of the firmware is not validated, quarantining the hardware component; when the integrity of the firmware is successfully validated, determining if a firmware update is required for the firmware loaded for use by the hardware component; and when a firmware update is required: validating an integrity of updated firmware for the hardware component, initiating loading of the updated firmware by the hardware component and allowing further initialization of the hardware component.

In some method embodiments, the reference signature for the firmware loaded by the hardware component is specified in a factory-provisioned device certificate that authenticates the hardware component. In some method embodiments, the factory-provisioned device certificate comprises a digital identity certificate that is cryptographically bound the IHS. In some method embodiments, the quarantining of the hardware component comprises exclusion of the hardware component from a root of trusted hardware of the IHS.

In various additional embodiments, systems may include: a hardware component of an Information Handling System (IHS), wherein operations of the hardware component may be adapted based on the operation of different firmware versions; and a remote access controller supporting remote management of the hardware component of the IHS, the remote access controller comprising a logic unit and a memory device having instructions stored thereon that, upon execution by the logic unit, cause the remote access controller to: calculate a measurement based on firmware loaded for use by the hardware component; based on the measurement, validate an integrity of the firmware loaded for use by the hardware component against a reference signature; when the integrity of the firmware is not validated, quarantine the hardware component; when the integrity of the firmware is successfully validated, determine if a firmware update is required for the firmware loaded for use by the hardware component; and when a firmware update is required: validate an integrity of updated firmware for the hardware component, initiate loading of the updated firmware by the hardware component and allow further initialization of the hardware component.

In some system embodiments, the reference signature for the firmware loaded by the hardware component is specified in a factory-provisioned device certificate that authenticates the hardware component. In some system embodiments, the factory-provisioned device certificate comprises a digital identity certificate that is cryptographically bound the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
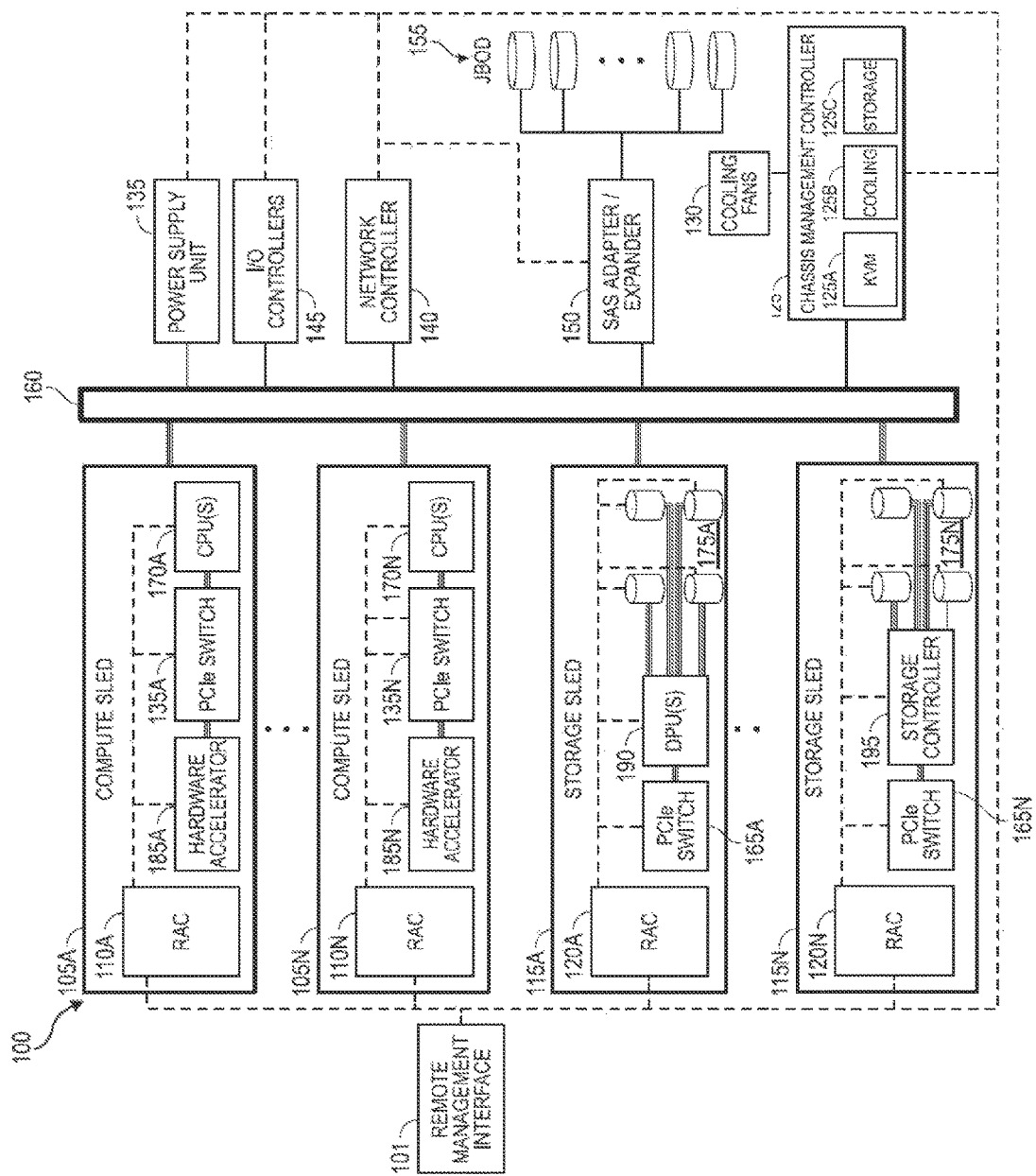
FIG. 1 is a diagram illustrating certain components of a chassis configured, according to some embodiments, for updating firmware during authentication of hardware components used by IHSs installed in the chassis.

FIG. 1 is a block diagram illustrating certain components of a chassis 100 comprising one or more compute sleds 105a-n and one or more storage sleds 115a-n that may be configured to implement the systems and methods described herein for updating firmware during authentication of hardware components of IHSs installed in the chassis 100. Embodiments of chassis 100 may include a wide variety of hardware configurations in which one or more IHS 105a-n, 115a-n are installed in chassis 100. Such variations in hardware configuration may result from chassis 100 being factory assembled to include components specified by a customer that has contracted for manufacture and delivery of chassis 100.

Upon delivery and deployment of a chassis 100, the chassis 100 may be modified by replacing and/or adding various hardware components, in addition to replacement of the removeable IHSs 105a-n, 115a-n that are installed in the chassis. In addition, once the chassis 100 has been deployed, firmware used by individual hardware components of the IHSs 105a-n, 115a-n, or by other hardware components of chassis 100, may be modified in order to update the operations that are supported by these hardware components. In some embodiments, such firmware updates may be used to enable and disable features of an IHS and/or chassis that have been licensed for use by an owner or operator of the chassis 100, where the features that have been enabled and conditions for use of the enabled features may be set forth in a service agreement that is associated with the chassis 100.

Upon configuration of a chassis 100 for operation with hardware components of the chassis utilizing specific firmware versions, such configurations of hardware may be subjected to benchmark tests in order to validate the suitability of this specific collective configuration of components for specific processing tasks and/or operation in specific environments. Once validated, such collective configurations of hardware components may be utilized in the configuration and deployment of other identical chassis. As described in additional detail below, such approved collective configurations of hardware components and the approved firmware versions by each hardware components in the configuration may be utilized during initialization and authentication of hardware components of chassis 100 in determining whether firmware updates are required. Through such embodiments, required firmware updates are incorporated into the authentication of the respective hardware component.

Chassis 100 may include one or more bays that each receive an individual sled (that may be additionally or alternatively referred to as a tray, blade, and/or node) IHSs, such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the IHSs 105a-n, 115a-n of the chassis. These high-speed data links may be used to support algorithm implementations that span multiple processing, networking and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks. In some instances, firmware updates to hardware accelerators 185a-n may serve to adapt the hardware accelerator for a particular computing function, or for a particular operating environment.

Chassis 100 may be installed within a rack structure that provides at least a portion of the cooling utilized by the IHSs 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support various types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
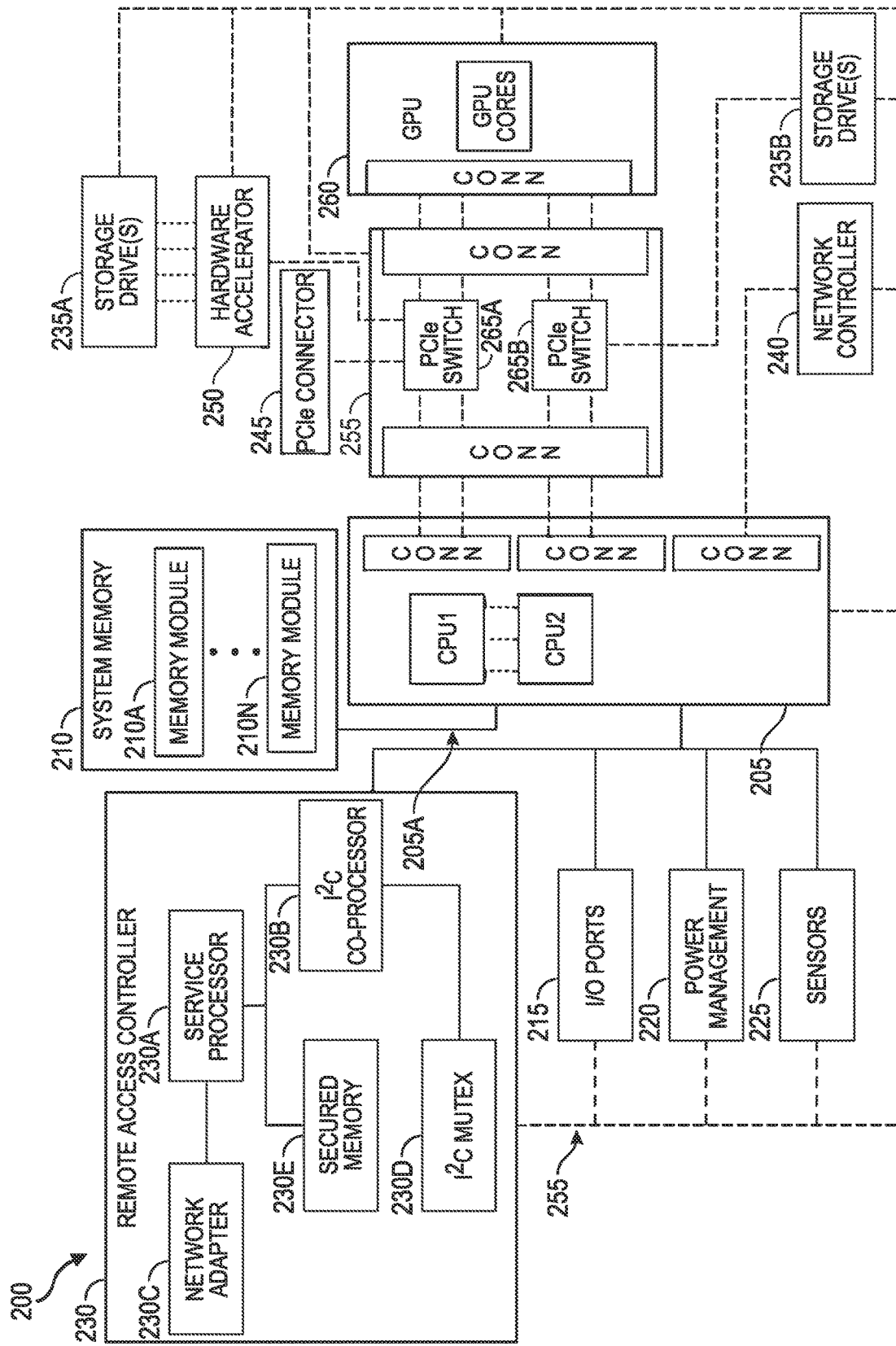
FIG. 2 is a diagram illustrating certain components of an IHS configured, according to some embodiments, for updating firmware during authentication of hardware components of the IHS.

In certain embodiments, each individual sled 105a-n, 115a-n-n may be an IHS such as described with regard to IHS 200 of FIG. 2. Sleds 105a-n, 115a-n may individually or collectively provide computational processing resources that may be used to support a variety of e-commerce, multimedia, business and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are an expected in the administration and operation of data centers, but it is preferable to avoid any downtime in making such firmware updates. For instance, in updating the firmware of the individual hardware components of the chassis 100, it is preferable that such updates can be made as quickly as possible, such that the hardware component, and in some cases the entire chassis, are out of service for as little time as possible. Firmware images may be relatively large files that may take several minutes to transmit to the hardware component being updated.

Due to the size of firmware images and also due to the limited processing, communication and storage capabilities of some managed hardware components of chassis 100, implementing many firmware updates result in significant downtime. In existing systems, a chassis is initialized and its constituent components may be validated as operating using authentic instructions. After a successful authentication and the chassis has been fully initialized and in operation, existing chassis may then determine whether the firmware of any of the hardware components of the chassis should be upgraded. If an upgrade is required, operations of the hardware component may be halted until this update can be completed. Accordingly, in existing systems, requirements for operation of hardware components to utilize specific firmware versions that necessitate an upgrade, or a downgrade, of the firmware of hardware component results in the hardware component being out of service, along with potentially all or some of the other components of chassis. In certain instances, collective configurations of hardware components may be required in order to operate a chassis, such as according to a benchmarked and validated configuration. In such instances, a delay in updating firmware for a single hardware component of the collective configuration may preclude operation of the chassis until this component has been validated as operating using a firmware version that is approved per a collective configuration of multiple managed hardware components of the chassis. Accordingly, embodiments provide capabilities for embedding required firmware updates as a part of the authentication of a chassis, thus ensuring the chassis is not put into operation until its firmware has been both validated and updated as approved for use as part of a collective configuration of hardware components of that chassis.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105*a-n*, 115*a-n* and/or of chassis 100. In support of these monitoring and management functions, remote access controllers 110*a-n* may utilize both in-band and side-band (i.e., out-of-band) communications with various managed components of a respective sled 105*a-n* and chassis 100. Remote access controllers 110*a-n*, 120*a-n* may collect various types of sensor data, such as collecting temperature sensor readings that are used in support of airflow cooling of the chassis 100 and the sleds 105*a-n*, 115*a-n*. In addition, each remote access controller 110*a-n*, 120*a-n* may implement various monitoring and administrative functions related to a respective sleds 105*a-n*, 115*a-n*, where these functions may be implemented using sideband bus connections with various internal components of the chassis 100 and of the respective sleds 105*a-n*, 115*a-n*. In various embodiments, these capabilities of the remote access controllers 110*a-n*, 120*a-n* may be utilized in updating the firmware of hardware components of chassis 100 and/or of hardware components of the sleds 110*a-n*, 120*a-n*, without having to reboot the chassis or any of the sleds 110*a-n*, 120*a-n*.

The remote access controllers 110*a-n*, 120*a-n* that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to the firmware utilized by all of the storage drives 175*a-n* installed in a chassis 100, or to the firmware utilized by all of the storage drives 175*a-n* of a particular model or manufacturer. In some instances, remote management interface 101 may include an inventory of the hardware, software and firmware of chassis 100 that is being remotely managed through the operation of the remote access controllers 110*a-n*, 120*a-n*. The remote management interface 101 may also include various monitoring interfaces for evaluating telemetry data collected by the remote access controllers 110*a-n*, 120*a-n*. In some embodiments, remote management interface 101 may communicate with remote access controllers 110*a-n*, 120*a-n* via a protocol such the Redfish remote management interface. In embodiments, remote management interface 101 may be utilized to make changes to service agreements related to chassis 100 and/or IHSs 105*a-n*, 115*a-n*, thus initiating changes to firmware utilized by hardware components of chassis 100 and/or IHSs 105*a-n*, 115*a-n*.

In the illustrated embodiment, chassis 100 includes one or more compute sleds 105*a-n* that are coupled to the backplane 160 and installed within one or more bays or slots of chassis 100. Each of the individual compute sleds 105*a-n* may be an IHS, such as described with regard to FIG. 2. Each of the individual compute sleds 105*a-n* may include various different numbers and types of processors that may be adapted to performing specific computing tasks. In the illustrated embodiment, each of the compute sleds 105*a-n* includes a PCIe switch 135*a-n* that provides access to a hardware accelerator 185*a-n*, such as the described DPUs, GPUs, Smart NICs and FPGAs, that may be programmed and adapted for specific computing tasks, such as to support machine learning or other artificial intelligence systems. As described in additional detail below, compute sleds 105*a-n* may include a variety of hardware components, such as hardware accelerator 185*a-n* and PCIe switches 135*a-n*, that operate using firmware that may be occasionally updated, such as to adapt these components for operation according to different personalities.

As illustrated, chassis 100 includes one or more storage sleds 115*a-n* that are coupled to the backplane 160 and installed within one or more bays of chassis 100 in a similar manner to compute sleds 105*a-n*. Each of the individual storage sleds 115*a-n* may include various different numbers and types of storage devices. As described in additional detail with regard to FIG. 2, a storage sled 115*a-n* may be an IHS 200 that includes multiple solid-state drives (SSDs) 175*a-n*, where the individual storage drives 175*a-n* may be accessed through a PCIe switch 165*a-n* of the respective storage sled 115*a-n*.

As illustrated, a storage sled 115*a* may include one or more DPUs (Data Processing Units) 190 that provide access to and manage the operations of the storage drives 175*a* of the storage sled 115*a*. Use of a DPU 190 in this manner provides low-latency and high-bandwidth access to numerous SSDs 175*a*. These SSDs 175*a* may be utilized in parallel through NVMe transmissions that are supported by the PCIe switch 165*a* that connects the SSDs 175*a* to the DPU 190. In some instances, PCIe switch 165*a* may be in integrated component of a DPU 190. The immense data storage and retrieval capabilities provided by such storage sled 115*a* implementations may be harnessed by offloading storage operations directed as storage drives 175*a* to a DPU 190*a*, and thus without relying on the main CPU of the storage sled, or of any other component of chassis 100. As indicated in FIG. 1, chassis 100 may also include one or more storage sleds 115*n* that provide access to storage drives 175*n* via a storage controller 195. In some embodiments, storage controller 195 may provide support for RAID (Redundant Array of Independent Disks) configurations of logical and physical storage drives, such as storage drives provided by storage sled 115*n*. In some embodiments, storage controller 195 may be a HBA (Host Bus Adapter) that provides more limited capabilities in accessing storage drives 175*n*.

In addition to the data storage capabilities provided by storage sleds 115*a-n*, chassis 100 may provide access to other storage resources that may be installed components of chassis 100 and/or may be installed elsewhere within a rack that houses the chassis 100. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that, in some instances, may be configured and managed individually and without implementing data redundancy across the various drives 155. The additional storage resources 155 may also be at various other locations within a datacenter in which chassis 100 is installed.

In light of the various manners in which storage drives 175*a-n*, 155 may be coupled to chassis 100, a wide variety of different storage topologies may be supported. Through these supported topologies, storage drives 175*a-n*, 155 may be logically organized into clusters or other groupings that may be collectively tasked and managed. In some instances, a chassis 100 may include numerous storage drives 175*a-n*, 155 that are identical, or nearly identical, such as arrays of SSDs of the same manufacturer and model. Accordingly, any firmware updates to storage drives 175*a-n*, 155 requires the updates to be applied within each of these topologies being supported by the chassis 100. Despite the large number of different storage drive topologies that may be supported by an individual chassis 100, the firmware used by each of these storage devices 175a-n, 155 may be occasionally updated.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Network controller 140 operates according to firmware instructions that may be occasionally updated, such as to enable and disable features supported by the network controller.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated, such as to adapt the power supply unit for operation according to different personalities.

Chassis 100 may also include various I/O controllers 140 that may support various I/O ports, such as USB ports that may be used to support keyboard and mouse inputs and/or video display capabilities. Each of the I/O controllers 140 may operate according to firmware instructions that may be occasionally updated, such as to adapt the I/O controller 140 for operation with different external systems. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein for updating firmware during authentication of hardware components of IHS 200. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n or other type of server, such as an 1RU server installed within a 2RU chassis, that is configured to share infrastructure resources provided within a chassis 100. As with chassis 100, firmware updates may be used to enable and disable features of IHS 100. As described above, rather than initiating these firmware updates after IHS 100 has been initialized and put into operation, embodiments integrate such firmware updates for managed hardware components of IHS 100 into the authentication of IHS 100, such that IHS 100 is only fully booted once firmware has been authenticated and any firmware upgrades or downgrades that are required have been completed and validated. In this manner, IHS 100 is not taken out of service for any required firmware updates and instead incorporates requirements for operation using specific firmware versions into the authentication of IHS 100.

IHS 200 may utilize one or more system processors 205, that may be referred to as CPUs (Central Processing Units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210*a-n*, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265*a-b* that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265*a-b*, different embodiments may operate using different numbers of CPUs and PCIe switches. In addition to serving as I/O controllers that route PCIe traffic, PCIe switches 265*a-b* include switching logic that can be used to expand the number of PCIe connections that are supported by CPUs 205. PCIe switches 265*a-b* may multiply the number of PCIe lanes available to CPUs 205, thus allowing more PCIe devices to be connected to CPUs 205, and for the available PCIe bandwidth to be allocated with greater granularity. Each of the PCIe switches 265*a-b* may operate according to firmware instructions that may be occasionally updated.

Using the available PCIe lanes, the PCIe switches 265*a-b* may be used to implement a PCIe switch fabric. Also through this switch fabric, PCIe NVMe (Non-Volatile Memory Express) transmission may be supported and utilized in high-speed communications with SSDs, such as storage drives 235*a-b*, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235*a-b* in various topologies, in the same manner as described with regard to the chassis 100 of FIG. 1. In the illustrated embodiment, storage drives 235*a* are accessed via a hardware accelerator 250, while storage drives 235*b* are accessed directly via PCIe switch 265*b*. In some embodiments, the storage drives 235*a-b* of IHS 200 may include a combination of both SSD and magnetic disk storage drives. In other embodiments, all of the storage drives 235*a-b* of IHS 200 may be identical, or nearly identical. In all embodiments, storage drives 235*a-b* operate according to firmware instructions that may be occasionally updated.

As illustrated, PCIe switch 265*a* is coupled via a PCIe link to a hardware accelerator 250, such as a DPU, Smart-NIC, GPU and/or FPGA, that may be a connected to the IHS via a removeable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the IHS 200. In some embodiments, the processing cores of hardware accelerator 250 include ARM (advanced RISC (reduced instruction set computing) machine) processing cores. In other embodiments, the cores of DPUs 250*a-b* may include MIPS (microprocessor without interlocked pipeline stages) cores, RISC-V cores, or CISC (complex instruction set computing)

(i.e., x86) cores. Hardware accelerator may operate according to firmware instructions that may be occasionally updated.

In the illustrated embodiment, the programmable capabilities of hardware accelerator 250 implements functions used to support storage drives 235a, such as SSDs. In such storage drive topologies, hardware accelerator 250 may implement processing of PCIe NVMe communications with SSDs 235a, thus supporting high-bandwidth connections with these SSDs. Hardware accelerator 250 may also include one more memory devices used to store program instructions executed by the processing cores and/or used to support the operation of SSDs 235a such as in implementing cache memories and buffers utilized in support high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions. As described, in some embodiments, updates to firmware utilized by hardware accelerators 250 may enable and disable features supported by the hardware accelerators 250. Accordingly, validation of hardware accelerators 250 as operating using authenticated firmware instructions may include an additional requirement that the hardware accelerators are only operating using only certain versions of authenticated firmware instructions. Authentication of firmware instructions loaded for use by hardware accelerator 250 may be insufficient if hardware accelerator 250 is not properly configured to operate with an approved version of the firmware that is compatible with a current collective configuration of hardware components of IHS 200

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to the IHS. Through couplings to PCIe connectors 245a, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware during authentication of managed hardware components of IHS 200, may operate using validated instructions, and thus within the root of trust of IHS 200.

As described in additional detail below, remote access controller 230 may similarly validate the integrity and authenticity of firmware instructions utilized by various managed hardware components 205, 235a-b, 240, 250, 255, 260 of IHS 200. Embodiments may incorporate enforcement of firmware version requirements into the authentication of the firmware utilized by managed hardware components 205, 235a-b, 240, 250, 255, 260 of IHS 100. Once remote access controller 230 has authenticated the current firmware for use by an individual managed hardware component, remote access controller 230 may determine whether the authenticated firmware corresponds to a version that is required for operation of the IHS, such as per a collective configuration of hardware components that has been benchmarked and validated for specific computing operations.

In some embodiments, remote access controller 230 may include a service processor 230a, or specialized microcontroller, that operates management software that supports remote monitoring and administration of IHS 200. The management operations supported by remote access controller 230 may be remotely initiated, updated and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 255 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 255. In some instances, the sideband management connections supported by remote access controller 230 may include PLDM (Platform Level Data Model) management communications with the managed devices 205, 235*a-b*, 240, 250, 255, 260 of IHS 200. In some embodiments, the remote access controller 230 may additionally or alternatively use MCTP messaging to transmit Vendor Defined Messages (VDMs) via the in-line PCIe switch fabric supported by PCIe switches 265*a-b*. For instance, remote access controller 230 may transmit firmware to managed devices utilizing inband signaling, such as VDMs that are transmitted using MCTP over the PCIe switch fabric that is implemented by PCIe switch 255, and/or utilizing sideband signaling, such as PLDM communications transmitted via sideband connections 255 supported by an I2C co-processor 230*b* of the remote access controller 230.

As illustrated, remote access controller 230 may include a network adapter 230*c* that provides the remote access controller with network access that is separate from the network controller 240 utilized by other hardware components of the IHS 200. Through secure connections supported by network adapter 230*c*, remote access controller 230 communicates management information with remote management interface 101. In support of remote monitoring functions, network adapter 230*c* may support connections between remote access controller 255 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235*a-b*, 240, 250, 255, 260 of the IHS 200 through the operation of an I2C multiplexer 230*d* of the remote access controller. As illustrated in FIG. 2, the managed devices 205, 235*a-b*, 240, 250, 255, 260 of IHS 200 are coupled to the CPUs 205, either directly or directly, via in-line buses that are separate from the I2C sideband bus 255 connections used by the remote access controller 230 for device management.

In certain embodiments, the service processor 230*a* of remote access controller 230 may rely on an I2C co-processor 230*b* to implement sideband I2C communications between the remote access controller 230 and the managed hardware components 205, 235*a-b*, 240, 250, 255, 260 of the IHS 200. The I2C co-processor 230*b* may be a specialized co-processor or micro-controller that is configured to implement a I2C bus interface used to support communications with managed hardware components 205, 235*a-b*, 240, 250, 255, 260 of IHS. In some embodiments, the I2C co-processor 230*b* may be an integrated circuit on the same die as the service processor 230*a*, such as a peripheral system-on-chip feature that may be provided by the service processor 230*a*. The sideband I2C bus 255 is illustrated as single line in FIG. 2. However, sideband bus 255 may be comprises of multiple signaling pathways, where each may be comprised of a clock line and data line that couple the remote access controller 230 to I2C endpoints 205, 235*a-b*, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
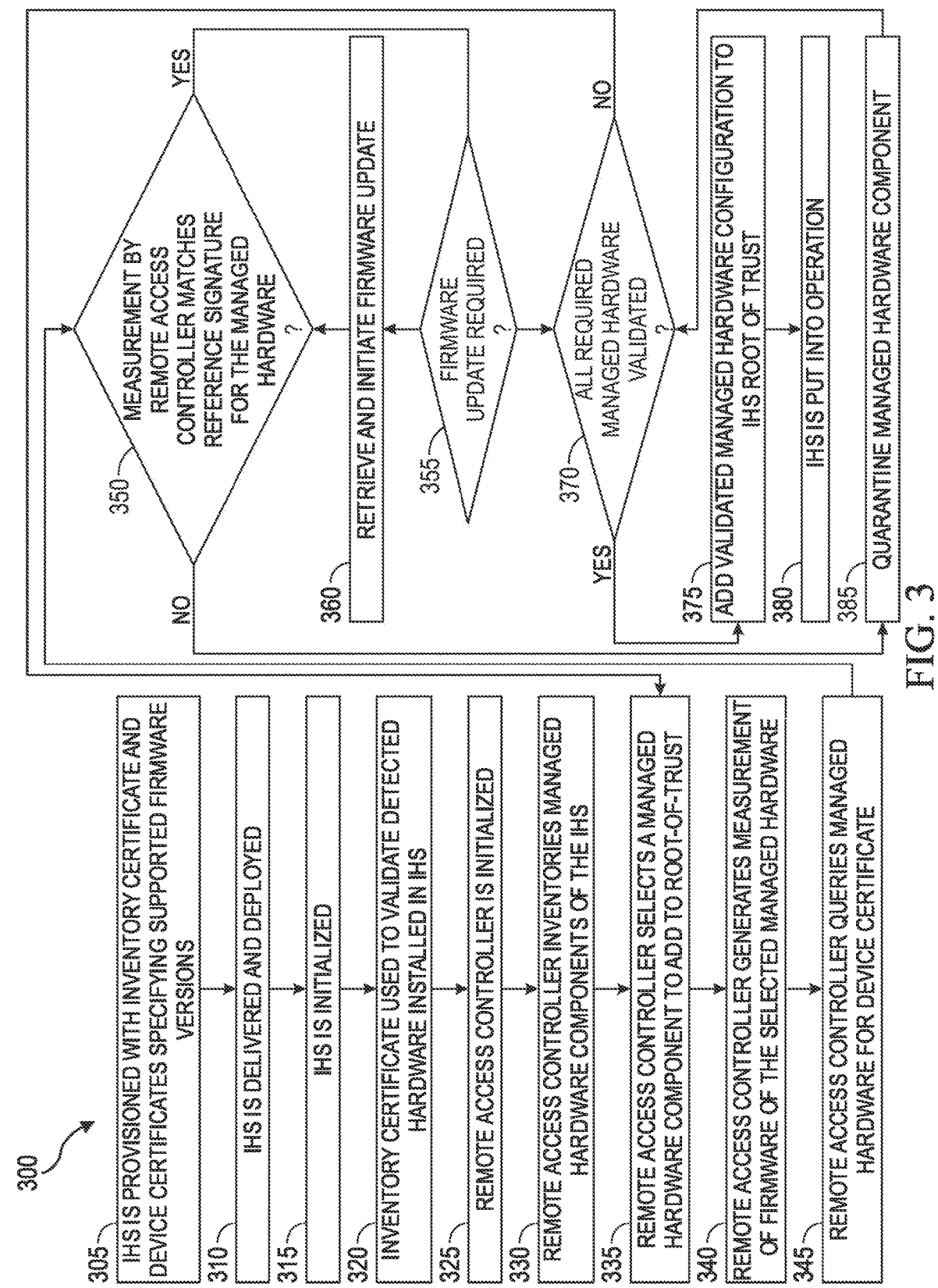
FIG. 3 is a flow chart diagram illustrating certain steps of methods, according to some embodiments, for updating firmware during authentication of hardware components of an IHS.
Figure 4:
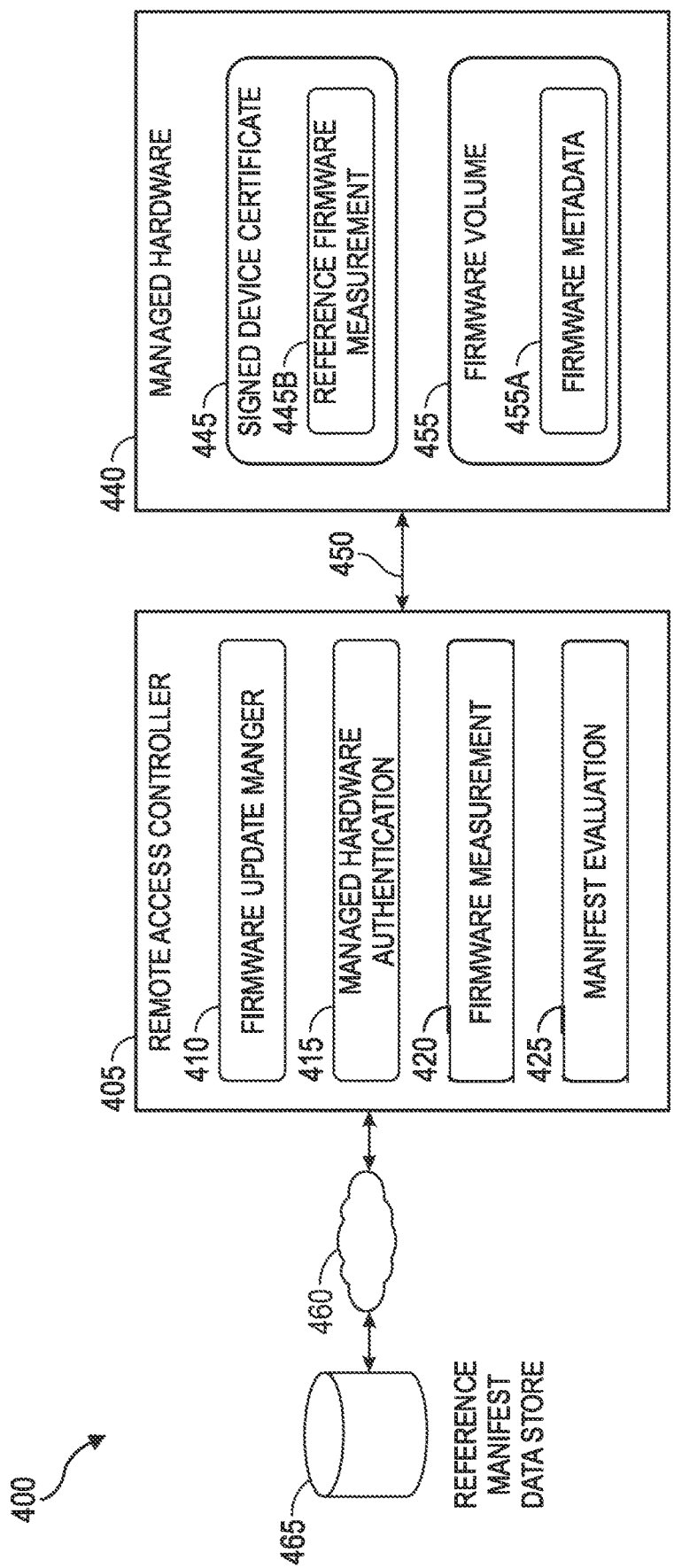
FIG. 4 is a diagram illustrating certain components of a system, according to some embodiments, for updating firmware during authentication of hardware components of an IHS.

FIG. 3 is a flow chart diagram illustrating certain steps of methods, according to some embodiments, for updating firmware during authentication of hardware components of an IHS, such as the IHSs described with regard to FIGS. 1 and 2. Some embodiments of the method of FIG. 3 may begin, at block 305, with the factory assembly and provisioning of an IHS, such as a server IHS described with regard to FIGS. 1 and 2, where the IHS is provisioned to include an inventory certificate that is cryptographically bound to the IHS and that identifies the factory-installed hardware of the IHS. FIG. 4 is a diagram illustrating certain components of a system, according to some embodiments, for updating firmware during authentication of hardware components of an IHS.

As illustrated in FIG. 4, a remote access controller 405 of an IHS interfaces with a managed hardware component 440 of the IHS in authenticating the firmware utilized by the hardware component, as well as ensuring the managed hardware component 440 is operating using a particular firmware version. In support of these capabilities, the factory provisioning process may also generate one or more device certificates that are also cryptographically bound to the IHS, and that each service to identify and authenticate individual hardware components of the IHS. An individual device certificate may include one or more digital signatures that correspond to firmware that has been authorized for operation by that managed hardware component 440, where a separate digital signature may be generated and included in the device certificate for each version of firmware that has been authorized for use by the managed hardware component 440.

In some instances, an IHS may be manufactured using a factory process that includes multiple phases of assembly, validation and provisioning that must be completed before the IHS is shipped to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS. For example, a customer request an IHS with a specific set of hardware components installed, where each of the hardware components in the requested configuration operates using a specific firmware version. In such instances, these collective configurations of hardware components may correspond to benchmarked and validated configurations that have been selected by customers for operating in specific environments and/or for specific computing applications.

Once the assembly of an IHS has been completed, the IHS may be subjected to manual and automated inspections that confirm the IHS has been properly assembled and does not include any defects. After confirming an IHS has been assembled without any manufacturing defects, factory provisioning of the IHS may be initiated. In some instances, the provisioning of an IHS at the factory may include various stages that may include stages for loading of firmware, configuring hardware components, and installing an operating system and other software. Various different aspects of this factory provisioning process may be conducted using a factory provisioning application, where this factory provisioning application may run on one or more servers and may interface with an IHS that is being provisioned once a requisite amount of firmware and software has been installed to the IHS.

A manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. The manifest generated during assembly of an IHS is provided to the factory provisioning application that will being used to provision the assembled IHS, which includes installing firmware and other software on the IHS.

As part of the this factory provisioning, one or more firmware versions and associated firmware settings may be loaded for use by various hardware components of the IHS. In some embodiments, the one or more firmware versions that are loaded for use by each hardware component during factory provisioning may be determined based on a service agreement or other configuration for the IHS that was selected by a customer as part of the purchase of the IHS. Once the set of firmware versions for each of the hardware components of the IHS has been selected, the factory provisioning application may confirm the authenticity and integrity of the selected firmware versions based on digital signatures provided by hardware component manufacturers or other entities providing the firmware. The manifest of the IHS may then be updated to identify the firmware versions that are supported by each of the managed hardware components 440 of IHS and may also be updated to include digital signatures associated with each of the supported firmware versions.

In this manner, the factory-provisioning system may upload one or more supported firmware versions to at least some of the factory-installed managed hardware components 440 of an IHS. As illustrated in FIG. 4, these approved firmware versions may be stored to a firmware volume 455 of a local data storage of the managed hardware component 440. In addition, each firmware version stored in the firmware volume 455 may be associated with firmware metadata 455a that may specify compatibility of a firmware version with specific collective configurations of hardware components supported by the IHS.

Based on the hardware inventory and firmware version information that is specified in the manifest of the IHS, the factory provisioning application may initiate the generation of an inventory certificate that may be used to validate the detected hardware components of the IHS as the same hardware components that were installed during the factory assembly of the IHS. In addition, the factory provisioning application may generate device certificates that each correspond to a managed hardware component 440 of the IHS and that may be used to validate that firmware versions that are authorized for use the respective managed hardware components.

As described with regard to FIGS. 1 and 2, an IHS may include a remote access controller 405 that provides capabilities for remote management of an IHS, where these remote management capabilities may include sideband management of various managed hardware components 440 of an IHS. In some embodiments, the generation of an inventory certificate and device certificates for a newly assembled IHS may be initiated via a request from the factory provisioning application to the remote access controller 405 of the IHS. As described with regard to FIG. 2, a remote access controller of an IHS may include cryptographic capabilities that operate within the root of trust of the IHS and that may include the ability to generate cryptographic keypairs. Utilizing such cryptographic capabilities, the remote access controller initiates the creation of an inventory certificate and one or more device certificates by generating a cryptographic key pair for use in validating the authenticity of inventory information and for authenticating the approved firmware versions that are specified in the individual device certificates.

In some embodiments, the remote access controller 405 generates one or more certificate signing requests (CSRs) for the generation of digital identity certificates, where the request specifies the public key of the key pair generated by the remote access controller 405, and also specifies the factory installed hardware inventory from the manifest that was generated during assembly of the IHS, and also specifies an inventory of the authorized firmware versions for one or more of the managed hardware components 440 of the IHS. The factory installed and provisioned hardware and firmware inventory information included in the CSRs may be signed by the remote access controller 405 using the private key from the generated keypair. The one or more CSRs for the requested identity certificates may then be transmitted to the factory provisioning application.

The factory provisioning application may submit the CSRs for signing by a factory certificate authority. Upon receipt of the CSRs, the factory certificate authority may parse from the CSRs: the hardware inventory information, the inventory of authorized firmware versions for the managed hardware components 440 of the IHS, the public key generated by the remote access controller 405 and the information specifying a requested signing key. Based on the information parsed from the CSRs, the factory certificate authority generates a digital identity certificate, referred to herein as an inventory certificate, that is associated with the public key provided by the remote access controller and that specifies the factory installed hardware inventory of the IHS. In addition, the factory certificate authority also generates one or more digital identity certificates, referred to herein as device certificates, that are also associated with the public key provided by the remote access controller and that each specify the firmware versions approved for used by a respective managed hardware component 440 of the IHS.

The factory certificate authority may submit the generated identity certificates for signing by a hardware security module that may be a dedicated hardware component of a factory provisioning server that safeguards cryptographic keys and implements cryptographic functions utilized in the factory provisioning process. The hardware security module digitally signs the submitted identity certificates, which are then returned to the factory provisioning application. In some embodiments, the factory provisioning application may retain a copy of the signed certificates. In some instances, copies of the inventory and device certificates may be retained to reference manifest data store 465 utilized in providing ongoing support of the IHS once it has been shipped and has been deployed by a customer, such as in issuing updated certificates for an IHS in response to changes to the IHS that result in changes to the authorized firmware versions supported by hardware components of the IHS.

The signed inventory and device certificates may then be loaded to the assembled IHS as part of the factory provisioning of the IHS. In some embodiments, the signed inventory certificate may be uploaded to a secured memory of the remote access controller 405, such as described with regard to FIG. 2. As illustrated in FIG. 4, the generated device certificates 445 may be stored directly to a local data storage of the respective managed hardware component 440 to which the device certificate corresponds. Also as indicated in FIG. 4, a signed device certificate may include a reference firmware measurement for each firmware version that has been approved for use by the managed hardware component 440. With the generation and transfer of the signed identity certificates completed, additional factory provisioning of the assembled IHS may be completed and, at 310, the assembled IHS is shipped from the factory to a customer. The IHS may be received at a data center and may be further provisioned for deployment within a specific computing and/or storage cluster of the data center.

Once received and provisioned, at 315, the IHS is initialized for the purposes of placing the IHS into operation, such as to provide computing services within a data center. As part of the initialization of the IHS, various procedures may be implemented for validating the authenticity of the hardware components of the IHS. As described, an IHS may be factory provisioned to include an inventory certificate that specifies the factory installed hardware components of the IHS, and may additionally include factory provisioned device certificates that specify the authorized firmware for use in operation of hardware components of the IHS. At 320, a factory-provisioned inventory certificate may be utilized to validate the hardware components detected during initialization of the IHS. Each detected hardware component is identified by the IHS and the hardware component may be initialized only if its detected identity matches a hardware identity specified in the factory provisioned inventory certificate.

One of the hardware components of the IHS that may be authenticated against the inventory certificate information is a remote access controller 405. Upon the detected hardware components being validated, at 325, certain core components of the IHS may initialized within the root of trusted hardware, including the remote access controller 405. At 330, the remote access controller 405 generates an inventory of the detected managed hardware components 440 of the IHS. As described, a remote access controller 405 may utilize various inband and sideband communication buses for interfacing with managed hardware components 440 of the IHS. The remote access controller 405 may generate an inventory of managed hardware components 440 using information collected by via these management buses and/or based on queries to various systems, such as the BIOS, of the IHS.

From this generated inventory information, at 335, the remote access controller 405 selects an individual managed hardware component 440 to be added to the root of trusted hardware components of the IHS. As hardware components of the IHS are authenticated and validated as operating using authentic firmware instructions, each hardware component may be added to the root of trusted components of an IHS, thus granting the trusted hardware component with access to certain protected resources available via the IHS. As described, certain hardware components may be part of collective configurations of component that represent benchmarked and validated configurations of hardware components. In such instances, the remote access controller 405 may select a managed hardware component 440 that is part of such a collective configuration of hardware components. As individual hardware components are authenticated and their firmware is upgraded or downgraded as required, the remote access controller 405 may progressively add each hardware component of this collective configuration to the IHS root trust, while also ensuring that the individual hardware components operate according to firmware versions that are approved for use in the collective configuration of components. In some embodiments, none of the hardware components of a collective configuration of components is added to the root of trust until all components of the configuration have been authenticated and firmware requirements have also been validated. In such embodiments, initialization of the IHS, including booting an operating system of the IHS, may be halted until a collective configuration of hardware components can be added to the root of trusted components of the IHS. In some embodiments, booting of the operating system may be halted until all required firmware updates have been applied.

For the selected managed hardware component 440, at 340, the remote access controller 405 generates a measurement of the firmware that has been loaded for use by that hardware component. As described with regard to FIG. 1, a remote access controller may include various cryptographic abilities, including firmware measurement capabilities 420 for use in generating digital signatures, such as hash values, based on software instructions. These firmware measurement capabilities 420 are utilized to generate a digital signature based on the firmware loaded for use by the selected managed hardware component 440. This generated measurement may then be compared to a reference measurement for this specific firmware version that has been loaded for use by managed hardware component 440, thus validating the integrity of the firmware to be used in the operation of managed hardware component.

In order to obtain the reference measurement for the loaded firmware, at 345, the remote access controller 405 queries the managed hardware component 440 for the factory provisioned device certificate 445 for this hardware component. In some embodiments, the factory provisioning of device certificates may store the individual certificates 445 to a local storage of the individual managed hardware components 440 that will be attested using the certificates. In some instances, local storage of the individual hardware components may be insufficient or otherwise infeasible for storage of the device certificate. In some embodiments, the managed hardware component 440 may instead be factory provisioned with a link that provides the location of a device certificate for that hardware component, where this location may be a secure storage on the IHS or a location and a remote data store 465.

Once the device certificate 445 has been retrieved, the remote access controller 405 may validate the authenticity of the device certificate through queries to a certificate authority. If the authenticity of the device certificate is confirmed, a managed hardware authentication 415 capability of the remote access controller 405 may utilize digital signatures 445b included in the device certificate 445 in order to validate the integrity of the firmware loaded for use in operation by the managed hardware component 440. As described, an individual managed hardware component 440 may be reconfigured for operation in various modes based on loading different firmware that has been authorized for use by that component. Accordingly, the device certificate may include digital signatures that are reference measurements 445b for various versions of firmware that may be used to configure the managed hardware component 440 different modes of operation.

As indicated in FIG. 3, at 350, the remote access controller 405 determines whether its measurements of the firmware loaded for use by the managed hardware component 440 match the reference measurements, such as using the cryptographic capabilities of the remote access controller for managed hardware authentication 415. If the signature generated by the firmware measurement capabilities 420 from the loaded firmware of the hardware component matches the signature specified in the device certificate 445, at 355, the remote access controller 405 determines whether the loaded firmware should be updated. In some embodiments, the remote access controller 405 may select from available firmware versions specified in the device certificate 445 in determining valid upgrades or downgrades. As described, a reference manifest data store 465 may maintain certificate information for an IHS and may also maintain a reference manifest of approved configurations of collective arrangements of hardware components for an IHS or chassis housing multiple IHSs, such as configurations that correspond to benchmarked and validated sets of hardware components. This reference manifest data store 465 may also specify upgrade requirements for an IHS and/or for an approved hardware configuration, such as requirements that the most recent updated version of available firmware must be utilized or the managed hardware component 440 cannot be added to the root of trust of the IHS. In scenarios where the managed hardware component 440 is part of an approved hardware configuration that is a collection of required components, failure to satisfy such firmware version requirements may result in inability to operate using this approved hardware configuration.

In some instances, a firmware upgrade may be required in order to utilize a different firmware version that is compatible with an approved hardware configuration that is currently being utilized. For instance, where an IHS is being booted for operation using an approved hardware configuration for use in a secure environment, use of particular firmware versions may be required that utilize certain cryptographic protocols. In some scenarios, the firmware version that has been initially loaded for use by a hardware component may not be a firmware version that is required for the approved hardware configuration that is in use. In such scenarios, embodiments may continue, at 360, by initiating an update of the firmware utilized by the managed hardware component 440, such as using through the capabilities of a firmware update manager 410 that may be configured to locate required firmware and to transmit a firmware image to a firmware volume 455 of the managed hardware component 440. As described, in some instances, hardware component 440 may support rebootless updates, such that updated firmware may be transmitted to the hardware component and this firmware update may be applied without having to reboot the component, or the IHS, in order for the firmware update to take effect.

In other instances, compatibility of the managed hardware component 440 with the approved hardware configuration that is in use requires a downgrade of the firmware that has been loaded for use by the hardware component. In some instances, the firmware of the managed hardware component 440 may be automatically updated without regard to compatibility requirements for the hardware component as a member of an approved hardware configuration. In such scenarios, the upgraded firmware may not yet be included within the firmware that has been approved for use in the collective configuration of hardware components. Accordingly, the remote access controller 405 determines from the manifest for the approved hardware configuration that a downgrade of firmware for the managed hardware component 440 is required for compatibility with an approved configuration of components. In such instances, the required firmware update will be downgrade the firmware version that is utilized by the managed hardware component 440.

As indicated in FIG. 3, once the firmware update has been retrieved and loaded for use by the managed hardware component 440, embodiments may return to 350, where the signature generated by the remote access controller based on the updated firmware is compared against the reference signature for the updated firmware version, where the reference signature 445b for the updated firmware version may be retrieved from the device certificate 445 for the managed hardware component 440. Once the required firmware update has been completed and the loaded firmware has been authenticated against the device certificate, or in scenarios where no update of the firmware is required, at 370, the remote access controller 405 may determine whether all of the hardware components that are required components of the approved hardware configuration that is in use have been validated. In instances where not all hardware components of the approved hardware configuration have been validated, embodiments may return, at 355, to the remote access controller 405 selecting another managed hardware component of the approved configuration for validation based on the device certificate for that hardware component and based on requirements set forth in the reference manifest data store 365. In some embodiments, booting of the operating system of the IHS may be halted until, at 370, no more updates are required, thus preventing of booting of the IHS with firmware that should be updated.

In scenarios where all of the managed hardware components of an approved configuration have been validated, at 375, the collective set of hardware components may be added to the root of trusted hardware components of the IHS. Once the detected hardware components of the IHS have been validated as authentic and operate according to any firmware version requirements, at 380, the IHS may be put into operation. As described, firmware updates may take considerable time. Additionally, conducting firmware updates during ongoing operations of an IHS may subject the firmware update process to errors that can render a hardware component inoperable, or at least require manual administration of that hardware, which may remove the entire IHS from service. Accordingly, embodiments avoid firmware updates during ongoing operations of the IHS by embedding the firmware update requirements as part of the authentication of the managed hardware components of the IHS.

As indicated in FIG. 3, in scenarios where the firmware loaded for use by a managed hardware component cannot successfully validated against reference signature 445b from the device certificate 445 for that component, at 385, the managed hardware component 440 may be quarantined, where the specific restrictions of the quarantine may be set forth in policies specified in the reference manifest data store 465. For instance, a hardware component may be quarantined by omitting the hardware from the root of trusted hardware components, thus restricting the hardware component from access protected resources of the IHS, such as from access protected data stores and/or from accessing I/O ports supported by the IHS. In other instances, a hardware component may be quarantined by restricting the inputs and/or outputs by the hardware components. For instance, a quarantined components may be limited by the remote access controller 405 to receiving PLDM commands and may be restricted from issuing PLDM commands on any bus managed by the remote access controller 405. In other instances, a hardware component may be quarantined by disabling the hardware component such that it is booted. A quarantined hardware component may be similarly restricted from issuing any SPDM commands on a bus managed by the remote access controller, thus prohibiting the hardware component from accessing security functions that would otherwise be available. In this manner, managed hardware components that cannot be authenticated as operating using specific versions of firmware are prevented from accessing protected resources of an IHS.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising a plurality of hardware components installed within an enclosure, the IHS further comprising:
   one or more CPUs installed within the enclosure of the IHS and utilizing one or more buses to transmit communications to the plurality of hardware components of the IHS; and
   a remote access controller installed within the enclosure of the IHS and operating from a separate power plane from the one or more CPUs and that supports remote management of the Information Handling System (IHS), the remote access controller comprising a logic unit and a memory device having instructions stored thereon that, upon execution by the logic unit, cause the remote access controller to:
      upon initialization of the IHS, calculate a measurement based on firmware loaded for use by a first of the hardware components of the IHS, wherein further initialization of the IHS is halted by the remote access controller until an integrity of the firmware loaded for use by the first hardware component is validated and no firmware update is required for the first hardware component;
      based on the measurement, evaluate the integrity of the firmware loaded for use by the first hardware component against a reference signature;
      when the integrity of the firmware is not validated based on the evaluation, quarantine the first hardware component;
      when the integrity of the firmware is successfully validated based on the evaluation, determine whether a firmware update is required for the firmware loaded for use by the first hardware component; and
      when a firmware update is required for the first hardware component: validate an integrity of updated firmware for the first hardware component, initiate loading of the updated firmware by the first hardware component and allow further initialization of the first hardware component and allow further initialization of the IHS.

2. The IHS of claim 1, wherein the initiated loading of the updated firmware by the first hardware component comprises the remote access controller retrieving a firmware image that includes the updated firmware and transmitting the updated firmware to the first hardware component prior to the allowing of further initialization of the IHS.

3. The IHS of claim 1, wherein the reference signature for the firmware loaded by the first hardware component is specified in a factory-provisioned device certificate that authenticates the first hardware component.

4. The IHS of claim 3, wherein the factory-provisioned device certificate comprises a digital identity certificate that is cryptographically bound to the IHS.

5. The IHS of claim 3, wherein the factory-provisioned device certificate is stored to a local storage of the first hardware component during factory-provisioning of the IHS.

6. The IHS of claim 3, wherein the factory-provisioned device certificate is stored at a location specified in a link stored to a local storage of the first hardware component during factory-provisioning of the IHS.

7. The IHS of claim 3, wherein the factory-provisioned device certificate specifies a plurality of digital signatures, each corresponding to a version of firmware approved for operation by the first hardware component.

8. The IHS of claim 7, wherein execution of the instructions further causes the remote access controller to:
   when a firmware update is required, select an available firmware version for use as the updated firmware for the first hardware component from the firmware versions specified in the device certificate of the first hardware component.

9. The IHS of claim 8, wherein each of the firmware versions specified in the device certificate of the first hardware component comprises firmware for operation of the first hardware component in a different mode.

10. The IHS of claim 1, wherein the quarantine of the first hardware component comprises exclusion of the first hardware component from a root of trusted hardware of the IHS.

11. The IHS of claim 1, wherein the quarantine of the first hardware component comprises restricting certain bus communications by the first hardware component.

12. The IHS of claim 1, wherein the quarantine of the first hardware component comprises disabling the first hardware component.

13. The IHS of claim 2, wherein an operating system of the IHS is not initialized until the integrity of the firmware loaded for use by the first hardware component has been authenticated and no firmware update is required.

14. A method for updating firmware during authentication of a hardware component of a server device, wherein the firmware updates are managed by a remote access controller of the server device that operates from a separate power plane from a system processor of the server device and that provides remote management of the hardware component, the method comprising:
   upon initialization of the server device, calculating a measurement based on firmware loaded for use by the hardware component, wherein further initialization of the server device is halted by the remote access controller until an integrity of the firmware loaded for use by the first hardware component is validated and no firmware update is required for the first hardware component;
   based on the measurement, evaluate the integrity of the firmware loaded for use by the hardware component against a reference signature;
   when the integrity of the firmware is not validated based on the evaluation, quarantining the hardware component;
   when the integrity of the firmware is successfully validated based on the evaluation, determining if a firmware update is required for the firmware loaded for use by the hardware component; and
   when a firmware update is required for the first hardware component: validating an integrity of updated firmware for the hardware component, initiating loading of the updated firmware by the hardware component, allowing further initialization of the hardware component, and allowing further initialization of the server device.

15. The method of claim 14, wherein the reference signature for the firmware loaded by the hardware component is specified in a factory-provisioned device certificate that authenticates the hardware component.

16. The method of claim 15, wherein the factory-provisioned device certificate comprises a digital identity certificate that is cryptographically bound to the server device.

17. The method of claim 14, wherein the quarantining of the hardware component comprises exclusion of the hardware component from a root of trusted hardware of the server device.

18. A system remote access controller supporting remote management of a plurality of hardware components of a server in which the remote access controller is installed, the remote access controller comprising:
   a logic unit and a memory device having instructions stored thereon that, upon execution by the logic unit, cause the remote access controller to:
      upon initialization of the server, calculate a measurement based on firmware loaded for use by a first of the plurality of hardware components of the server, wherein further initialization of the server is halted by the remote access controller until an integrity of the firmware loaded for use by the first hardware component is validated and no firmware update is required for the first hardware component;
      based on the measurement, evaluate the integrity of the firmware loaded for use by the hardware component against a reference signature;
      when the integrity of the firmware is not validated based on the evaluation, quarantine the hardware component;
      when the integrity of the firmware is successfully validated based on the evaluation, determine if a firmware update is required for the firmware loaded for use by the hardware component; and
      when a firmware update is required for the first hardware component: validate an integrity of updated firmware for the hardware component, initiate loading of the updated firmware by the hardware component, allow further initialization of the hardware component, and allow further initialization of the server.

19. The system of claim 18, wherein the reference signature for the firmware loaded by the hardware component is specified in a factory-provisioned device certificate that authenticates the hardware component.

20. The system of claim 19, wherein the factory-provisioned device certificate comprises a digital identity certificate that is cryptographically bound to the server.

* * * * *

UNITED STATES PATENT AND TRADEMARK OFFICE
CERTIFICATE OF CORRECTION

| | | |
|---|---|---|
| PATENT NO. | : 12,468,811 B2 | Page 1 of 1 |
| APPLICATION NO. | : 17/934228 | |
| DATED | : November 11, 2025 | |
| INVENTOR(S) | : Deepaganesh Paulraj et al. | |

It is certified that error appears in the above-identified patent and that said Letters Patent is hereby corrected as shown below:

In the Claims

In Column 26, Line 12, Claim 18 delete "18. A system remote access controller supporting remote" and insert -- 18. A remote access controller supporting remote- -- therefor.

Signed and Sealed this
Sixteenth Day of December, 2025

John A. Squires
*Director of the United States Patent and Trademark Office*